No. 840,615. PATENTED JAN. 8, 1907.
A. C. FUNK & C. E. MICKLE.
CLOVER BUNCHER.
APPLICATION FILED FEB. 28, 1903.
3 SHEETS—SHEET 1.
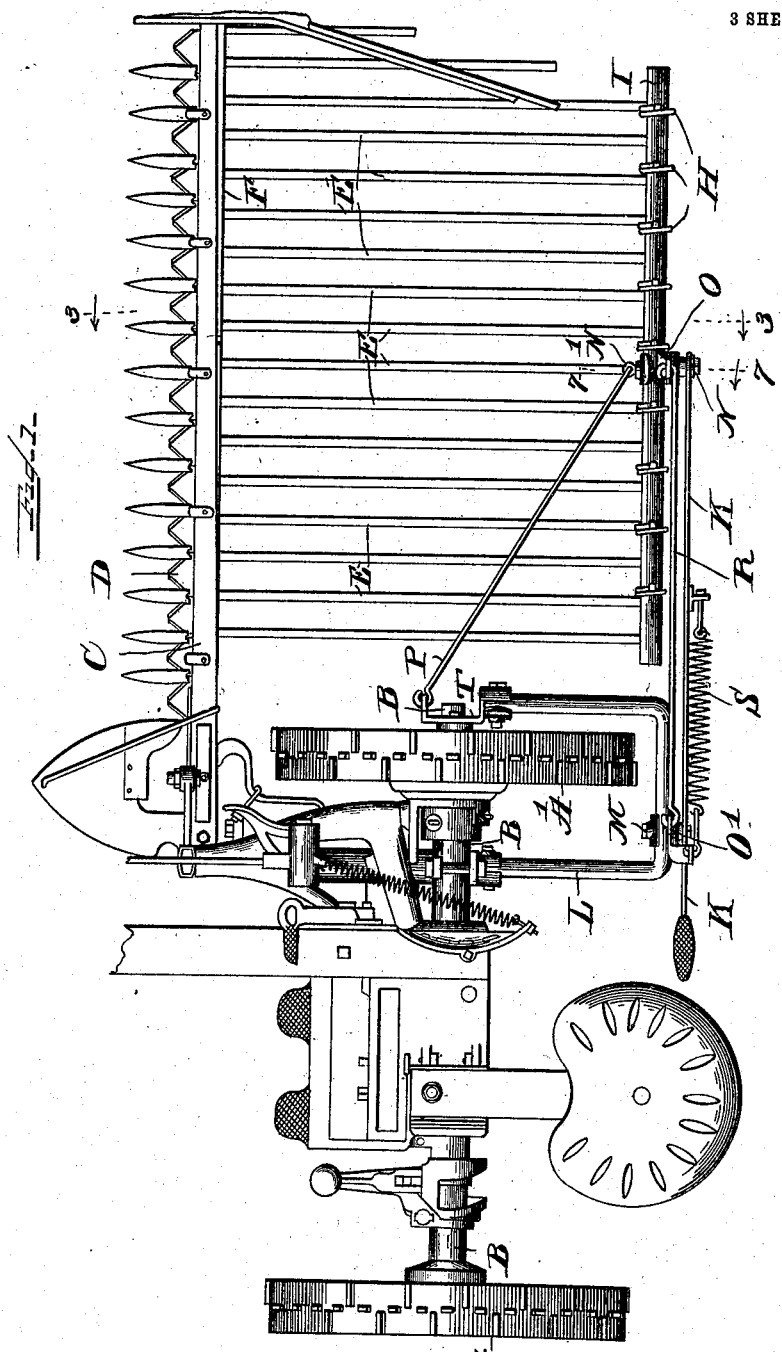

No. 840,615. PATENTED JAN. 8, 1907.
A. C. FUNK & C. E. MICKLE.
CLOVER BUNCHER.
APPLICATION FILED FEB. 28, 1903.
3 SHEETS—SHEET 2.
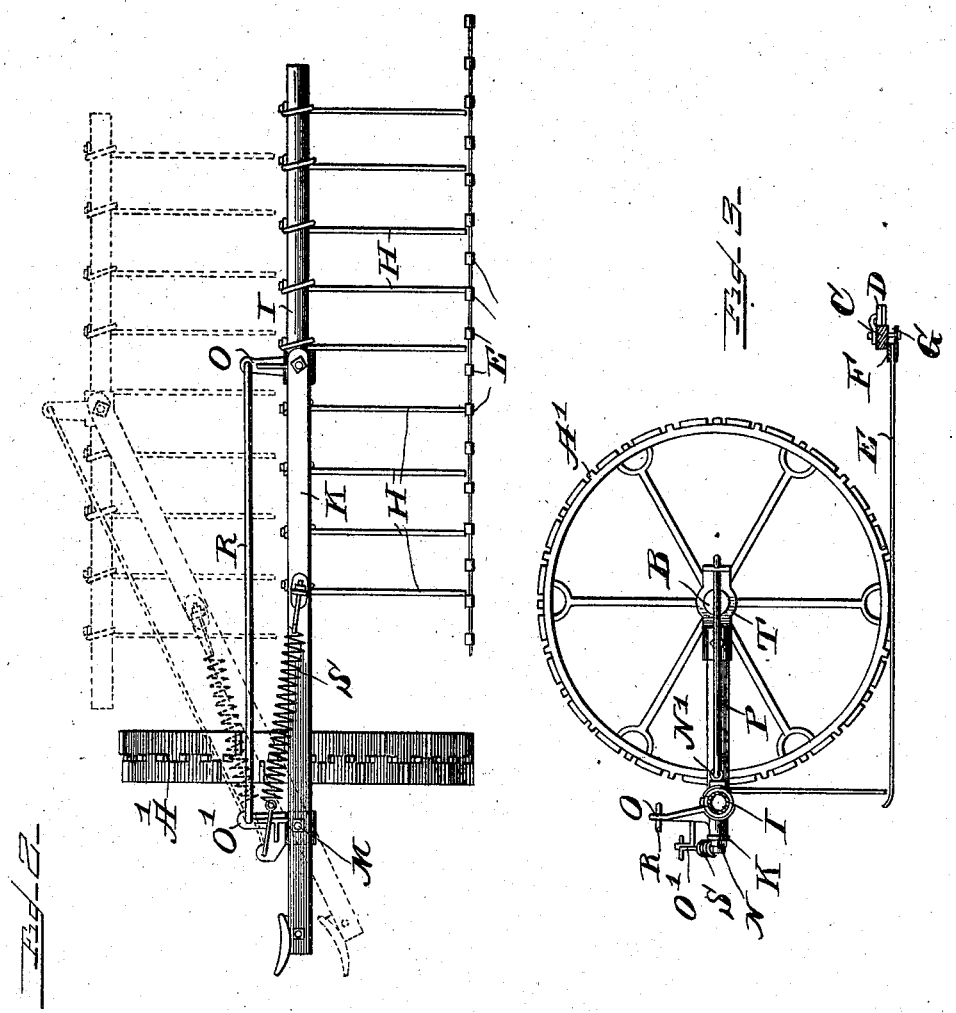

No. 840,615.
PATENTED JAN. 8, 1907.
A. C. FUNK & C. E. MICKLE.
CLOVER BUNCHER.
APPLICATION FILED FEB. 28, 1903.
3 SHEETS—SHEET 3.
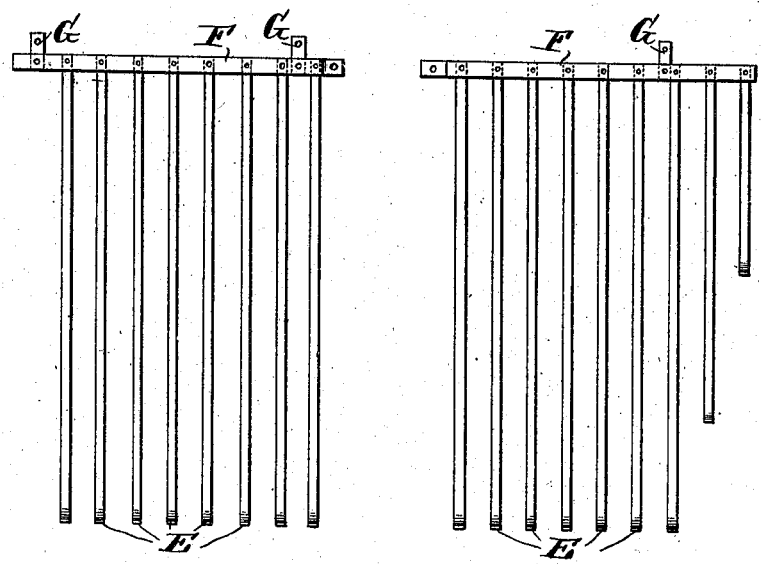
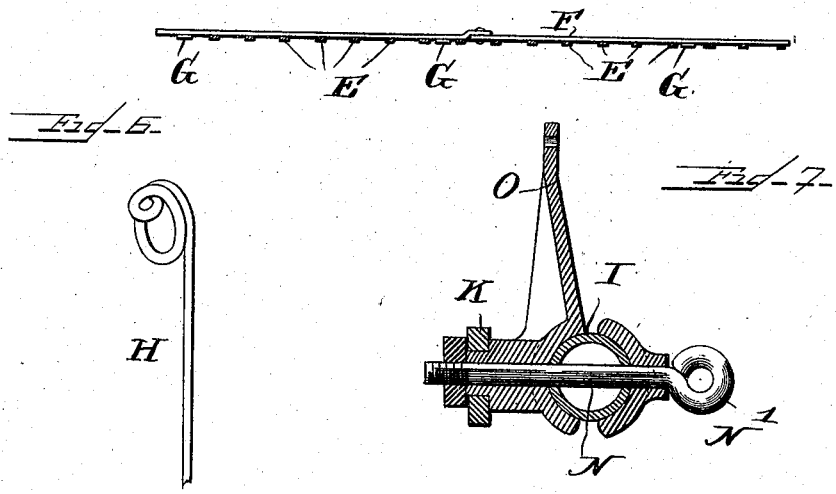

UNITED STATES PATENT OFFICE.

ALFRED C. FUNK AND CHARLES E. MICKLE, OF SPRINGFIELD, OHIO, ASSIGNORS TO INTERNATIONAL HARVESTER COMPANY, A CORPORATION OF NEW JERSEY.

CLOVER-BUNCHER.

No. 840,615.  Specification of Letters Patent.  Patented Jan. 8, 1907.

Application filed February 28, 1903. Serial No. 145,504.

*To all whom it may concern:*

Be it known that we, ALFRED C. FUNK and CHARLES E. MICKLE, citizens of the United States, residing at Springfield, in the county of Clark and State of Ohio, have invented a new and useful Improvement in Clover-Bunchers, of which the following is a specification.

This invention relates to a clover-buncher—that is, a machine for cutting clover and arranging it in rows or bunches, and thus depositing it upon the ground.

The invention consists, substantially, in the construction set forth in the specification and hereinafter more particularly pointed out in the claims.

Like letters refer to the same parts in the several figures of the drawings, in which—

Figure 1 is a plan view of a mowing-machine with the tongue broken away and the clover-buncher attachment applied thereto. Fig. 2 is a rear view of one of the master-wheels of a mowing-machine and the clover-buncher attachment. Fig. 3 is a vertical section through the clover-buncher attachment on the line 3 3, Fig. 1, showing the manner of applying the same to the master-wheel axle. Fig. 4 is a plan view of the two sections of the carrying slats or tines. Fig. 5 is a transverse section of the carrying slats or tines. Fig. 6 is a detail view in elevation of one of the spring teeth or fingers. Fig. 7 is a vertical section on the line 7 7, Fig. 1, of the joint connecting the carrying-arms with the head or top bar.

Many different forms of devices have been devised for arranging the clover as it is cut into rows or bunches and delivering the same upon the ground, and the present invention is designed as an improvement upon that class of machines. It will be understood that any usual form of mower is employed to cut the clover and that the attachment for carrying it and detaining in sufficient quantity in the form of bunches is applied to such mower and arranged to be conveniently operated to effect this purpose and then deliver the bunch or row in the easiest and most convenient manner. Therefore the particular construction of the mower, which forms no part of the essence of the invention, is not specifically described in this specification. It may be of the well-known form containing a frame, two master-wheels, seat, finger-bar, knife, and mechanism for operating the same, as is shown in the drawings.

The master-wheels are designated, respectively, by the letters A and A', the latter letter being the wheel at the right of the seat. The frame of the mower is designated by the letter B, the finger-bar by the letter C, and the knife by the letter D. At the rear of the finger-bar is arranged a series of slats, rods, or tines, (designated by the letter E,) which are rigidly secured to a cross-bar F, as shown in Figs. 4 and 5 of the drawings, and this cross-bar is preferably made in two sections, as illustrated, for convenience in shipment. In Fig. 4 the two sections are shown detached from each other, and in Fig. 5 joined together. This cross-bar F is attached to the finger-bar by any suitable means—such, for instance, as lugs G with suitable bolts, the nuts of which may be removed, and thereby permit the cross-bar to be detached. It is economical and desirable to use the same bolts which connect the knife-holding clips to also fasten the lugs or straps G to the finger-bar. Just over the rear ends of these slats or tines E is arranged a series of teeth or fingers H, which offer obstruction to the passage of the clover from the slats or tines. These fingers or teeth are preferably constructed as spring-teeth with coils at their upper ends, through which coils passes the head or bar I. This head is supported and controlled by a parallel or link motion, which will now be described.

A bar or rod K is pivoted to an attachment, with part of the frame projecting therefrom, which attachment in the drawings is designated by the letter L and is shown as of U form, which is a convenient shape, although of course other shapes might be employed, and this bar K, of which the bolt M is the fulcrum, has at its stubbleward end a means for operating it, either in the shape of a tread or a handle, preferably, as shown, a tread, while at the grassward end of said bar it is secured to a bolt N, which bolt is in turn fastened to the head arranged at the top of the teeth before mentioned. Of course the manner of securing the treadle or operating-bar K to the head of the series of teeth is capable of wide variation; but a convenient and desirable arrangement for this purpose is shown in Fig.

7 of the drawings, where the bar is clamped between the nut on the outer end of the bolt N and the hub of the upright or vertical bracket O, the purpose of which bracket will be presently set forth. Rising vertically above the head I is a bracket O, which at its lower end is preferably formed with a curved or concaved surface to fit the exterior of the head of the teeth and is also arranged to be secured to the bolt N and clamped against the head by means of the nut operating against the bar K. At the inner end of this bolt N there may be conveniently formed an eye N', to which may be hooked the brace-rod P, the other end of which may be hooked to any convenient support carried by the frame, but preferably to the particular form shown in the drawings, which will be hereinafter described. To the upper end of the upright or vertical bracket is secured the rod R, which at its other end is attached to a bracket O', each end of course of the rod R having sufficient play to allow turning of the bent ends of the same in the brackets. This rod R is, as will be seen, arranged parallel to the bar K, and thereby assists in producing a parallel motion, which enables the tooth-head and depending teeth to be lifted vertically, so as to be maintained in its true level position during the entire upward movement thereof, as indicated in dotted lines in Fig. 2 of the drawings. The bracket O' has also secured to it one end of a spring S, the other end of which is connected to the tread-bar K at a point approximately midway of its length. The purpose of this spring is to take some of the weight from the lower end of the teeth and to assist in raising such teeth when the operator presses on the treadle. Bracket O' is secured by the bolt M to a projection from or attachment of the frame, in this instance shown as the attachment L. The attachment to the frame is in this instance and preferably in the form of a rod bent into U shape, so as to straddle the grassward master-wheel, the closed end of the U being to the rear of the machine and the open end being connected on each side by yokes or clamps. The yoke or clamp to the left of the master-wheel is, as shown, secured directly to the frame, in this case being the boxing surrounding the axle, and the other arm of the U-frame being journaled on the grassward end of the main axle through the bent plate T, which is bolted to the grassward arm of the U-frame and has a hole through which the end of the axle protrudes and an arm to which the brace-rod P is hooked. It is obvious, however, that this form of arrangement to carry the fork-head through the medium of the brace-rod and the parallel arms may be varied in the details of its construction without departing from the principles of the invention.

Other variations may be made in the construction shown and described by any one skilled in the art without departing from the spirit of the invention, and we therefore do not wish to be understood to limiting ourselves to the exact details of construction shown and described.

What we claim, and desire to secure by Letters Patent, is—

1. In a clover-buncher, the combination with a carrier and a vertical gate at the rear thereof, with mechanism for raising and lowering said gate with reference to the carrier, said means operating to move such gate in parallel lines so as to maintain its upper and lower edges in a horizontal position when raised above the carrier; substantially as and for the purpose set forth.

2. In a clover-buncher, the combination with a mower and a carrier, of a gate or obstructing-fork arranged to move vertically toward and from the carrier, and parallel arms connected to such gate and extending to and connected to a support secured to the main frame of the mower whereby said gate maintains parallel relation in the vertical movements thereof; substantially as and for the purpose set forth.

3. In a clover-buncher, the combination with a mower, of a carrier, an obstructing gate or fork mounted for vertical movement toward and from said carrier, parallel arms arranged above each other and secured to the gate near the longitudinal center thereof, an attachment carried by the main frame, the other ends of said arms being pivoted to said attachment to swing in a vertical plane whereby said gate maintains parallel relation with respect to itself in the vertical movements thereof, as and for the purpose set forth.

4. In a clover-buncher, the combination with a mower having a finger-bar, of a carrier mounted on said finger-bar, and an obstructing gate or fork mounted to move vertically toward and from said carrier, an attachment secured to the main frame of the mower and forming a support for said gate, and pivotal connections between said gate and attachment for moving said gate vertically toward and from said carrier, as and for the purpose set forth.

5. In a clover-buncher, the combination with a mower having a main frame and an attachment mounted on the main frame of a carrier, an obstructing gate or fork, and an inner brace-rod pivoted to the inner side of the head of the gate or fork and to the end of the attachment carried by the frame.

6. In a clover-buncher, the combination with a mower, of a carrier, an obstructing gate or fork, a pair of parallel bars or rods pivoted near the longitudinal center of the gate-head and also to an attachment of the main frame, and a spring pivoted at one end to such attachment and at the other end to one of the bars; substantially as and for the purpose set forth.

7. In a clover-buncher, the combination with a main frame and master-wheel, a forked attachment carried by the main frame, the arms of said attachment straddling the master-wheel, clamps for detachably connecting the ends of said arms to the main frame, and a carrier, a head or bar, fingers carried thereby and forming a gate said head or bar being pivotally mounted upon said attachment to swing in a vertical plane, as and for the purpose set forth.

8. In a clover-buncher, the combination with a mower including a finger-bar and an obstructing-gate arranged rearward of said finger-bar, of a U-shaped attachment adapted to straddle the grassward master-wheel and provided with detachable clamps, one arranged for each arm and respectively connected to the main frame and to the axle and provided with a bearing, and mechanism pivotally connecting the obstructing-gate with the said bearing; substantially as and for the purpose set forth.

9. In a clover-buncher, the combination with a mower and a gate, of a U-shaped attachment adapted to straddle the grassward master-wheel and having detachable clamps respectively for the main frame and the axle and provided with a fulcrum at the base of the U-shaped frame, a pair of parallel levers secured to such attachment, one of which constitutes the operating-lever and is journaled on the fulcrum and the other of which is journaled in vertical brackets, respectively secured to the head of the gate and to the attachment; substantially as and for the purpose set forth.

10. In a clover-buncher, the combination with a mower, of an obstructing-gate, a U-shaped attachment, one arm of which is detachably clamped to the frame and one arm provided with a plate journaled on the axle, a brace-rod having bearing at one end on said plate, which rod is journaled at its other end to the gate, and mechanism connecting the attachment with the gate whereby such gate is supported and braced by the attachment, as and for the purpose set forth.

11. In a clover-buncher, the combination with a mower and an obstructing-gate, of carrying-arms and a brace-rod, said arms and rod being respectively secured to the outer and inner sides of the gate-head, and a U-shaped frame arranged to straddle the grassward master-wheel and affording a support for the parallel arms connecting it to the gate and having at the end of the grassward arm of this attachment a plate journaled on the axle and provided with an eye for the brace-rod and having at the inner end of its other arm a clamp for securing such end to the frame; substantially as and for the purpose set forth.

12. In a clover-buncher, the combination with a mower and an obstructing-gate for bunching the material, of means for lifting the gate vertically, comprising a lever pivoted at one end to the gate and pivotally connected intermediate its ends to the main frame of the mower, and a rod arranged above and parallel to the lever, said rod being also pivotally connected at its ends to the gate and main frame respectively, and adapted to cause the gate to maintain its upper and lower edges in a horizontal position during the vertical movement thereof.

13. In a clover-buncher, the combination of a mower, an obstructing-gate, a head therefor, a bracket, an operating-lever pivotally connected at one end to said bracket and at the other to the mower-frame, and a bolt for connecting said bracket to said head, and a nut on said bolt operating to maintain the pivotal connection of said lever and bracket, as and for the purpose set forth.

14. In a clover-buncher, the combination with a mower, an obstructing-gate, and a head for the latter, of operating mechanism for supporting and manipulating the gate, including a bolt passing through said head and having an eye at one end, a brace-rod connected to said eye, a vertical bracket through which said bolt passes for clamping the same to said head, an operating-lever pivotally connected to said bracket, and a parallel bar also connected pivotally to said bracket, as and for the purpose set forth.

15. In a clover-buncher, the combination with a mower, of a carrier, an obstructing-gate, and a counterbalance for same; substantially as and for the purpose set forth.

16. In a clover-buncher, the combination with a side-cut mower, of a slatted platform attached to the cutter-bar, an obstructing-gate at the rear thereof, said gate being supported from the main frame and held against rearward movement by means of a diagonal brace extending from the gate to the main frame; substantially as and for the purpose set forth.

17. In a clover-buncher, a mower-frame, a gate, upwardly-extending brackets respectively carried by the mower-frame and gate, a rod pivotally connected at the ends thereof to said brackets to swing in a vertical plane, and a lever pivotally mounted on the frame and connected to the gate for swinging the latter vertically, said rod being adapted to maintain the upper and lower edges of said gate in horizontal position during the vertical movement thereof.

18. In a clover-buncher, the combination of a mowing-machine, a finger-bar, a slatted carrier located rearward thereof, a gate located rearward of the carrier but disconnected therefrom, and supporting and operating means for said gate arranged on the grainward side of the machine and including a lever pivotally connected to the frame of the machine and to the gate, whereby the gate may be raised or lowered bodily, and a rod above and parallel to the lever also pivotally connected respectively to the gate and frame and adapted to prevent the tilting of the upper and lower edges of the gate during its raising and lowering movement.

19. In a clover-buncher, the combination with a side-cut mower, of a carrier and a vertically-movable gate carrying rake-teeth located at the rear of such carrier, of mechanism for supporting such gate from the main frame of the machine, means for raising and lowering said gate, and means for maintaining the upper and lower edges of said gate in horizontal position during the raising and lowering movements thereof.

20. In a clover-buncher, the combination with a mowing-machine, of a slatted platform attached to the cutter-bar, an obstructing-gate at the rear thereof, said gate being supported from the main frame and held against rearward movement by means of a brace pivotally connected at one end to the gate and braced at the other end by the main frame at a point adjacent to the axle of the grainward traction-wheel.

21. In a clover-buncher, the combination with a mowing-machine, of a slatted platform attached to the cutter-bar, an obstructing-gate at the rear thereof, said gate being supported from the main frame and held against rearward movement by means of a brace pivotally connected to the gate at one end and at its other end pivotally connected to the axle of the grainward traction-wheel.

22. In a clover-buncher, the combination with a mowing-machine, of a slatted platform attached to the cutter-bar, an obstructing-gate at the rear thereof, said gate being supported from the main frame, and a brace connecting the axle of the grainward traction-wheel with the gate.

23. In a clover-buncher, the combination with a mowing-machine, of a slatted platform attached to the cutter-bar, an obstructing-gate at the rear thereof, said gate being supported from the main frame, and a brace loosely connected at one end to the axle of the grainward wheel and at the other end loosely connected to the gate.

24. In a clover-buncher, the combination with a mowing-machine, of a slatted platform attached to the cutter-bar, an obstructing-gate at the rear thereof, said gate being supported from the main frame, and a brace connecting the axle of the grainward traction-wheel with the gate, and having vertical and rolling adjustment at each end of said connection.

25. In a clover-buncher, the combination with a side-cut mower, of a platform attached to the cutter-bar, an obstructing-gate at the rear thereof, said gate being supported from the main frame of the mower, and a member adapted to hold said gate against rearward movement, said member connected at one end to said gate and braced at the other end by the main frame at a point adjacent to the axle of the grainward traction-wheel.

In witness whereof we have hereunto set our hands, this 24th day of February, 1903, in the presence of the subscribing witnesses.

ALFRED C. FUNK.
CHARLES E. MICKLE.

Witnesses:
MAURICE KANE,
H. B. SPERRY.